(12) United States Patent
Tao et al.

(10) Patent No.: US 9,996,557 B2
(45) Date of Patent: Jun. 12, 2018

(54) DATABASE STORAGE SYSTEM BASED ON OPTICAL DISK AND METHOD USING THE SYSTEM

(71) Applicants: Guangyi Tao, Beijing (CN); Yachun Lian, Beijing (CN); Zichuan Lian, Beijing (CN)

(72) Inventors: Guangyi Tao, Beijing (CN); Yachun Lian, Beijing (CN); Zichuan Lian, Beijing (CN)

( * ) Notice: Subject to any disclaimer, the term of this patent is extended or adjusted under 35 U.S.C. 154(b) by 630 days.

(21) Appl. No.: 14/417,492

(22) PCT Filed: Apr. 24, 2013

(86) PCT No.: PCT/CN2013/074600
§ 371 (c)(1),
(2) Date: Jan. 26, 2015

(87) PCT Pub. No.: WO2014/067270
PCT Pub. Date: May 8, 2014

(65) Prior Publication Data
US 2015/0193473 A1  Jul. 9, 2015

(30) Foreign Application Priority Data
Nov. 1, 2012  (CN) .......................... 2012 1 0431169

(51) Int. Cl.
*G06F 17/30* (2006.01)
*G06F 11/14* (2006.01)

(52) U.S. Cl.
CPC .... *G06F 17/30289* (2013.01); *G06F 11/1456* (2013.01); *G06F 11/1458* (2013.01); *G06F 11/1469* (2013.01); *G06F 17/30091* (2013.01); *G06F 2201/80* (2013.01)

(58) Field of Classification Search
CPC .......... G06F 17/30289; G06F 11/1456; G06F 11/1458
USPC ....................................... 707/680
See application file for complete search history.

*Primary Examiner* — James K Trujillo
*Assistant Examiner* — Jessica N Le
(74) *Attorney, Agent, or Firm* — Novoclaims Patent Services LLC; Mei Lin Wong

(57) ABSTRACT

A database storage system based on optical disk includes a database management system installed on a server, a magnetic disk storage device and an optical disk storage device connecting, via a data connection, to the server. The database management system processes database management and data management in response to data requests and a database is created in the magnetic disk storage device, and includes a field structure generation module, a record index generation module, a storage space allocation module, a storage space status module, a record linkage module, a record split module and a database creation on optical disk module. The integrity of data is maintained during a database backup process. The optical disk containing a subdatabase accepts the management of the database management system to serve as a normal data source. The databases are hierarchically stored using the storage devices. The methods for database backup and restoration are provided.

9 Claims, 7 Drawing Sheets

110
the capacity parameters of the optical disk storage media are obtained through the database management system

115
the database properties data of the magnetic disk database in the magnetic disk storage device is read, the capacity of each record is calculated, a starting record number and a termination record number of each subdatabase, as well as the number of the records of each subdatabase are determined by the record split module (u6)

120
the subdatabase files having the same database structure are separately created on the optical disks by the database structure generation module (u8)

125
the records between the corresponding starting record number and termination record number of each subdatabase are written sequentially into the subdatabase file on the corresponding optical disk by the database creation on optical disk module (u7)

130
the field structure information of the corresponding records is written into each subdatabase file by the field structure generation module (u1)

135
the index information of the corresponding records is written into each subdatabase file by the record index generation module (u2)

140
the position information of the standard storage units of the corresponding records is written into each database file by the storage space allocation module (u3)

145
the space information of the standard storage units is recorded by the storage space status module (u4)

150
the database properties data of the corresponding subdatabase is generated, and the backup of the database is completed by the record linkage module (u5)

FIG.4

210
a magnetic disk database file is created in a magnetic disk storage device by the database management system through the database structure generation module (u8)

215
the database properties data of the subdatabase on each optical disk is read, and the minimum record number and the maximum record number of the records are determined, as well as the capacity and the number of the records of each subdatabase determined by the database management system through the record split module (u6)

220
the records of each subdatabase are written sequentially into the magnetic disk database file in the magnetic disk storage device according to the record number order of each subdatabase by the database management system through the record merge module (u9)

225
the field structure information of the records is written into the magnetic disk database file by the field structure generation module (u1)

230
the index information of the records is written into the magnetic disk database file by the record index generation module (u2)

235
the position information of the standard storage units of the records is written into the magnetic disk database file by the storage space allocation module (u3)

240
the space information of the standard storage unit is recorded by the storage space status module (u4)

245
the database properties data of the magnetic disk database is generated, and the restoration process of the database is completed by the record linkage module (u5)

FIG.5

310
a magnetic disk database file is created in a magnetic disk storage device by the database management system through the database structure generation module (u8)

315
the database properties data of the subdatabase on each optical disk is read, and the record number and the data volume of the records are determined, as well as the capacity of the records of each subdatabase is determined by the database management system through the record split module (u6)

320
the required records are read from each subdatabase, then the required records are written into the database file in the magnetic disk storage device by the database management system through the record merge module (u9)

325
the field structure information of the records is generated by the field structure generation module (u1)

330
the index information of the records is generated by the record index generation module (u2)

335
the position information of the standard storage units is recorded by the storage space allocation module (u3)

340
the space information of the standard storage units is recorded by the storage space status module (u4)

345
the database properties data of the database in the magnetic disk storage device is generated, and the creation of the database in the magnetic disk using the data of the optical disk databases is completed by the record linkage module (u5)

FIG.6

410
a subdatabase file is created on an optical disk by the database management system through the database structure generation module (u8)

415
the database properties data of a magnetic disk database on a magnetic disk is read, and the storage capacity and the storage position of each record are determined by the database management system through the record split module (u6)

420
the required records are read from the magnetic disk database, then the required records are written into the database file on the optical disk by the database management system through the record merge module (u9)

425
the field structure information of the records is generated by the field structure generation module (u1)

430
the index information of the records is generated by the record index generation module (u2)

435
the position information of the standard storage units is recorded by the storage space allocation module (u3)

440
the space information of the standard storage units is recorded by the storage space status module (u4)

445
the database properties data of the subdatabase on the optical disk is generated, and the creation of the database on the optical disk using the data of the magnetic disk databases is completed by the record linkage module (u5)

FIG.7

DATABASE STORAGE SYSTEM BASED ON OPTICAL DISK AND METHOD USING THE SYSTEM

CROSS REFERENCE OF RELATED APPLICATION

This is a national phase national application of an international patent application number PCT/CN2013/074600 with a filing date of Apr. 24, 2013, which claimed priority of a foreign application number CN 201210431169.3 with a filing date of Nov. 1, 2012 in China. The contents of these specifications, including any intervening amendments thereto, are incorporated herein by reference.

BACKGROUND OF THE PRESENT INVENTION

Field of Invention

The present invention relates to a database storage system and method, and particularly relates to a storage system and method used for database backup.

Description of Related Arts

A database system usually consists of software and hardware. The software comprises a database management system (DBMS) and application program installed on an operating system. The DBMS is a kernel software of the database system and its main functions include definition and control of data, as well as creation, operation, management and maintenance of database. The hardware comprises a physical device forming a computer system which includes a server and a memory, and a peripheral device required to store database. The server provides a running environment for the operating system, and the memory provides a storage space for storing database. The storage device mainly used by the database is the magnetic disk and the magnetic disk array etc. So far, all database systems adopt the magnetic disk as a database-storage medium. The magnetic disk has the feature of high speed data access and easy expansion, and it is the best choice for real-time data processing.

However, the demand for high efficient response performance of the database system and the feature of physical structure of high speed operation of the magnetic disk device make Mean Time Between Failure (MTBF) of the system be not guaranteed for long time. When the scale of database becomes larger and larger, the reliability of the system declines rapidly by heavy use of magnetic disks. First of all, it will consume a lot of electric power to use large amounts of magnetic disks to store data. Taking a RAIDS magnetic disk array model as an example, the available capacity of five 2 TB high speed hard disks is about 8 TB, a database system with PB level needs at least 700 hard disks. In the case of solid state disk with smaller capacity, the number of solid state disks could be double. Therefore the magnetic disk is not appropriate for big data source. When the magnetic disk array operates, the power consumption is also considerable even if an energy-saving technology is used.

Because the content on the magnetic disk can be rewritten, the hard disk array cannot be used in the occasion required for higher security. The data on the magnetic disk are easy lost due to the physical damage of the magnetic disk, therefore a backup system must be configured to backup data in real-time or regularly. A real time backup system will also increase equipment investment and power consumption, while a regular backup system adopts often an incremental backup, and backups data in storage devices, such as the magnetic tape etc., the backed-up data cannot be read and used directly by the DBMS, the restoration time of backed-up data is long, and the normal operation time of the database system is affected during the restoration.

Therefore, the data that has not too high access frequency and must be preserved for long-term, as well as the data that belongs to being archived and preserved are not suitable for being stored using the magnetic disk storage device. With the rapid increase of file and data in various formats, the problems of their storage and use are challenging for the structure design of software and hardware of the database system.

SUMMARY OF THE PRESENT INVENTION

An object of the present invention is to provide a database storage system based on optical disk in order to solve the technical problems of expensive cost of storing database on the magnetic disk and the poor data security.

Another object of the present invention is to provide the methods for data processing using the above mentioned database storage system based on optical disk in order to solve the technical problems of a difficult balance between the security and the efficiency in the use of database system.

According to the present invention, the database storage system based on optical disk comprises a database management system installed on a server, and a magnetic disk storage device and an optical disk storage device connecting, via data connection, to the server, and a magnetic disk database created in the magnetic disk storage device; the database management system is arranged for completing the database management and data management of the magnetic disk and the optical disk storage devices in response to data requests; wherein the database management system comprises a field structure generation module, a record index generation module, a storage space allocation module, a storage space status module, a record linkage module, a record split module, a database creation on optical disk module.

The field structure generation module reads the field structure information of each record of the databases of the magnetic disk and the optical disk storage devices and writes the field structure information of each record of the databases into a database file or the database management system, wherein the field structure information includes a data type and a data length of each field of the record.

The record index generation module records the index information of each record of the databases and writes the index information of each record of the databases into the database file or the database management system (dm), wherein the index information includes a modification time and a modification content of each field of the records.

The storage space allocation module records the position information of the allocated standard storage units of each record in the database file, and writes the position information into the database file or the database management system.

The storage space state module records the free space information of the allocated standard storage units in the database file, and writes the free space information into the database file or the database management system.

The record linkage module combines the field structure information, the index information, the position information and the space information of the standard storage units of each record of the database to form the database properties data, and writes the database properties data into the database file or the database management system.

The record split module processes a record splitting process for the records of the database according to the command of the database management system, wherein the record splitting process is processed in a record unit, in which the database properties data of the databases is read, the position and the amount of data of each field in the records are determined, the records conforming to the command parameters are marked, and the marked information is written into the database file or the database management system.

The database creation on optical disk module writes the records of the magnetic disk database which fit the capacity of an optical disk into a subdatabase file on the optical disk created by the database management system, and generates the field structure information and the index information of the corresponding records, records the position information and the space information of the standard storage units by the database management system, and forms the database properties data of the subdatabase.

The database management system further comprises a database structure generation module, which forms an independent data file for the database structure of the databases; the database management system creates the subdatabases having the same database structure on the optical disks or the magnetic disk database having the same database structure in other magnetic disk storage device based on the independent data file.

The database management system further comprises a record merge module, which merges the records of subdatabases on the optical disks into the magnetic disk database in the magnetic disk storage device according to the command of the database management system, generates the field structure information and the index information of the corresponding records, records the position information and the space information of the standard storage units, and forms the database properties data of the magnetic disk database.

The method for processing data using the above mentioned database storage system based on optical disk, wherein the steps of performing backup of a magnetic disk database onto optical disks are as follows: in step 110, the capacity parameters of the optical disk storage media are obtained through the database management system; in step 115, the database properties data of the magnetic disk database in the magnetic disk storage device is read, the capacity of each record is calculated, a starting record number and a termination record number of each subdatabase, as well as the number of the records of each subdatabase are determined by the record split module, in step 120, the subdatabase files having the same database structure are separately created on the optical disks by the database structure generation module; in step 125, the records between the corresponding starting record number and termination record number of each subdatabase are written sequentially into the subdatabase file on the corresponding optical disk by the database creation on optical disk module; in step 130, the field structure information of the corresponding records is written into each subdatabase file by the field structure generation module; in step 135, the index information of the corresponding records is written into each subdatabase file by the record index generation module; in step 140, the position information of the standard storage units of the corresponding records is written into each database file by the storage space allocation module; in step 145, the space information of the standard storage units is recorded by the storage space status module; and in step 150, the database properties data of the corresponding subdatabase is generated, and the backup of the database is completed by the record linkage module.

The method for processing data using the above mentioned database storage system based on optical disk, wherein the steps of a restoring process for an optical disk database in a magnetic disk storage device are as follows: in step 210, a magnetic disk database file is created in a magnetic disk storage device by the database management system through the database structure generation module; in step 215, the database properties data of the subdatabase on each optical disk is read, and the minimum record number and the maximum record number of the records are determined, as well as the capacity and the number of the records of each subdatabase are determined by the database management system through the record split module; in step 220, the records of each subdatabase are written sequentially into the magnetic disk database file in the magnetic disk storage device according to the record number order of each subdatabase by the database management system through the record merge module; in step 225, the field structure information of the records is written into the magnetic disk database file by the field structure generation module; in step 230, the index information of the records is written into the magnetic disk database file by the record index generation module; in step 235, the position information of the standard storage units of the records is written into the magnetic disk database file by the storage space allocation module; in step 240, the space information of the standard storage units is recorded by the storage space status module (u4); and in step 245, the database properties data of the magnetic disk database is generated, and the restoration process of the database is completed by the record linkage module.

The method for processing data using the above mentioned database storage system based on optical disk, wherein the steps of creating a database on a magnetic disk using the data of optical disk databases are as follows: in step 310, a magnetic disk database file is created in a magnetic disk storage device by the database management system through the database structure generation module; in step 315, the database properties data of the subdatabase on each optical disk is read, and the record number and the data volume of the records are determined, as well as the capacity of the records of each subdatabase is determined by the database management system through the record split module; in step 320, the required records are read from each subdatabase, then the required records are written into the database file in the magnetic disk storage device by the database management system through the record merge module; in step 325, the field structure information of the records is generated by the field structure generation module; in step 330, the index information of the records is generated by the record index generation module; in step 335, the position information of the standard storage units is recorded by the storage space allocation module; in step 340, the space information of the standard storage units is recorded by the storage space status module; and in step 345, the database properties data of the database in the magnetic disk storage device is generated, and the creation of the database in the magnetic disk using the data of the optical disk databases is completed by the record linkage module.

The method for processing data using the above mentioned database storage system based on optical disk, wherein the steps of creating a database on an optical disk using the data of a magnetic disk database are as follows: in step 410, a subdatabase file is created on an optical disk by the database management system through the database structure generation module; in step 415, the database properties data of a magnetic disk database on a magnetic disk is read, and the storage capacity and the storage position of each record are determined by the database management system through the record split module; in step 420, the required records are read from the magnetic disk database, then the required records are written into the database file on the optical disk by the database management system through the record merge module; in step 425, the field structure information of the records is generated by the field structure generation module; in step 430, the index information of the records is generated by the record index generation module; in step 435, the position information of the standard storage units is recorded by the storage space allocation module; in step 440, the space information of the standard storage units is recorded by the storage space status module; and in step 445, the database properties data of the subdatabase on the optical disk is generated, and the creation of the database on the optical disk using the data of the magnetic disk databases is completed by the record linkage module.

The database storage system based on optical disk of this invention has improved the functions of database storage and backup; the database management system split a huge magnetic disk database into several subdatabases having the same structure definition and data integrity; the associated data of each record in the magnetic disk database does not need to be stored or associated by crossing databases, which makes the magnetic disk database keep the data integrity during the backup process; each optical disk containing the subdatabase can accept the management of the database management system to serve as a normal data source. The database management system can directly retrieve data on the optical disk as data backup using the features of the huge capacity and high security of storing data of optical disk storage devices, which provides a technical means for finally realizing that the optical disk replaces the magnetic disk as a database-storage medium. The cost of constructing the database storage system can be significantly decreased, and the energy consumption can be reduced, as well as the conflict between the data security and the data response performance can be solved.

The database backup, merging and restoring methods of this invention change the data format as data is in the backup status, and improve data backup and restoration speed, and do not affect the data response operation of the database management system, which makes the data of database can be directly stored on the optical disk, and provides a good approach for realizing that the data of database is hierarchically stored using the magnetic disk storage device and the optical disk storage device.

The present invention is further illustrated through the following embodiments and the accompanying drawings.

BRIEF DESCRIPTION OF THE DRAWINGS

FIG. 4 is flow diagram 1 of methods for data processing using the database storage system based on optical disk according to the preferred embodiment of the present invention.

FIG. 5 is flow diagram 2 of methods for data processing using the database storage system based on optical disk according to the preferred embodiment of the present invention.

FIG. 6 is flow diagram 3 of methods for data processing using the database storage system based on optical disk according to the preferred embodiment of the present invention.

FIG. 7 is flow diagram 4 of methods for data processing using the database storage system based on optical disk according to the preferred embodiment of the present invention.

DETAILED DESCRIPTION OF THE PREFERRED EMBODIMENT

Figure 1:
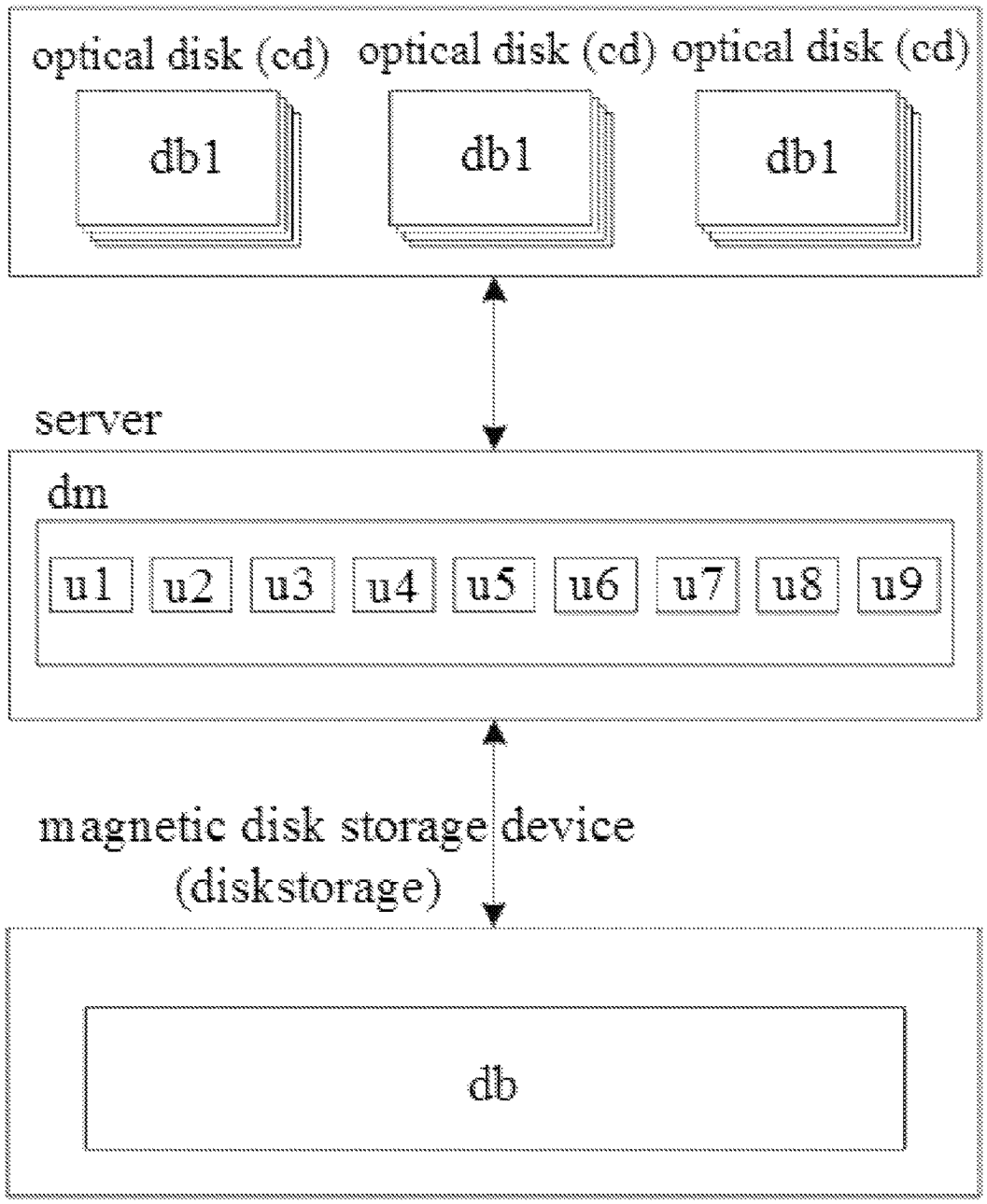
FIG. 1 is a schematic diagram of the structure according to the preferred embodiment of the database storage system based on optical disk of the present invention.
Figure 2:
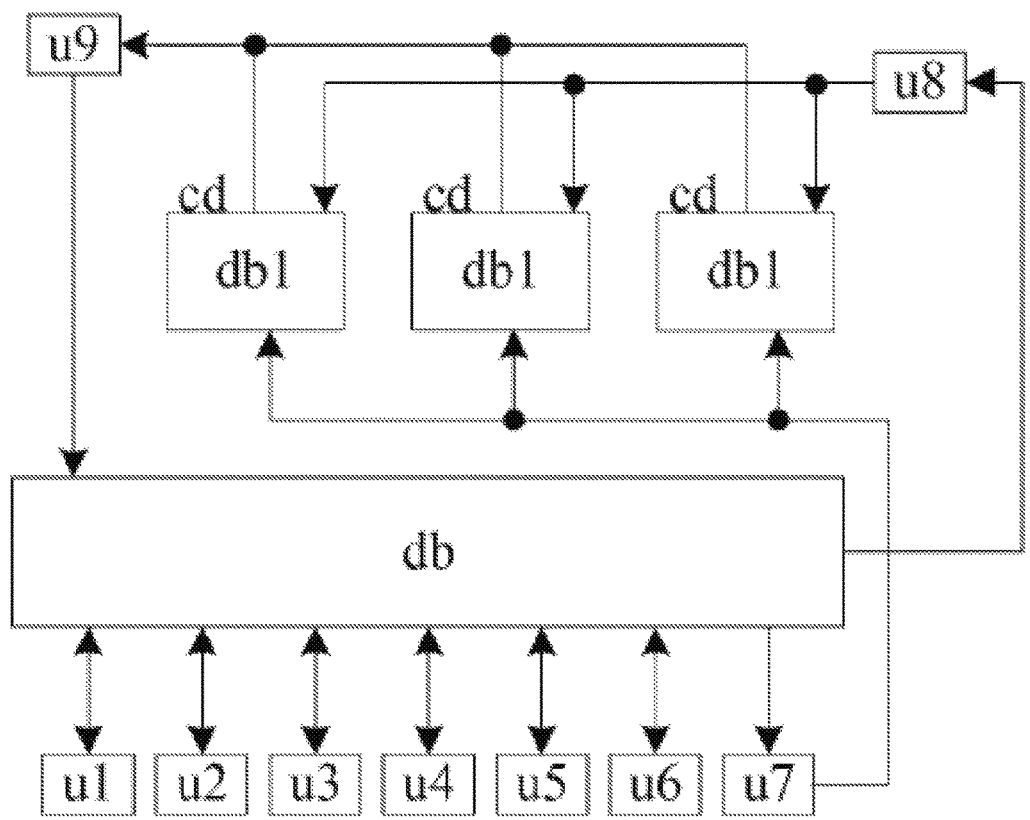
FIG. 2 is a schematic diagram of the structure of the database management system according to the preferred embodiment of the database storage system based on optical disk of the present invention.

According to the preferred embodiment of the present invention, which is shown in FIG. 1 and FIG. 2, a database storage system based on optical disk comprises a serve and a magnetic disk storage device (diskstorage); a database management system (dm) is installed on the server, a magnetic disk database (db) is installed in the magnetic disk storage device; the embodiments also comprise a jukebox as an optical disk storage device which completes exchanging optical disks in optical disk drives using an optical disk exchange mechanism, reading and writing data on each optical disk using the optical disk drives; the database management system uses the TRIP; the magnetic disk storage device uses the RAID magnetic disk array.

The server performs data connection with the jukebox and the magnetic disk storage device (diskstorage) respectively; the database management system (dm) responds to data requests, and creates a magnetic disk database (db) file on the magnetic disk, and manages the records of the database, and creates data backup on the optical disks (cd), and reads and restores the data; the jukebox completes exchanging the optical disks in the optical disk drives according to the corresponding data command of the database management system (dm).

The database management system (dm) comprises a field structure generation module (u1), a record index generation module (u2), a storage space allocation module (u3), a storage space status module (u4), a record linkage module (u5), a record split module (u6), a database creation on optical disk module (u7).

The field structure generation module (u1) reads the field structure information of each record of the databases of the magnetic disk and the optical disk storage devices and writes the field structure information of each record of the databases into a database file or the database management system (dm), wherein the field structure information includes a data type and a data length of each field of the record.

The record index generation module (u2) records the index information of each record of the databases and writes the index information of each record of the databases into the database file or the database management system (dm), wherein the index information includes a modification time and a modification content of each field of the records.

The storage space allocation module (u3) records the position information of the allocated standard storage units of each record in the database file, and writes the position information into the database file or the database management system (dm).

The storage space state module (u4) records the free space information of the allocated standard storage units in the database file, and writes the free space information into the database file or the database management system (dm).

The record linkage module (u5) combines the field structure information, the index information, the position information and the space information of the standard storage units of each record of the database to form the database properties data, and writes the database properties data into the database file or the database management system (dm).

The record split module (u6) process a record splitting process for the records of the database according to the command of database management system (dm), wherein the record splitting process is processed in a record unit, in which the database properties data of the databases is read, the position and the amount of data of each field in the records are determined, the records conforming to the command parameters are marked, and the marked information is written into the database file or the database management system (dm).

The database creation on optical disk module (u7) writes the records of the magnetic disk database (db) which fit the capacity of an optical disk into a subdatabase (db1) file on the optical disk created by the database management system (dm), generates the field structure information and the index information of the corresponding records, records the position information and the space information of the standard storage units by the database management system (dm) and forms the database properties data of the sub database (db1).

The database management system (dm) further comprises a database structure generation module (u8), which forms an independent data file for the database structure of the databases; the database management system (dm) creates the subdatabases (db1) having the same database structure on the optical disks or creates the magnetic disk database (db) having the same database structure in other magnetic disk storage device (diskstorage) based on the independent data file.

By means of the independent data file, the access right of the data in database can be effectively managed, and unexpectedly leaking the structure of the database is avoided when a database is directly created by the database management system. By means of encryption\decryption processing of the independent data file, leaking the structure of the database can be avoided when a database is created in a different place or position. Only if having the structure of database and the database file simultaneously, an available database can be created, and illegally and directly using the database file is avoided.

The database management system (dm) further comprises a record merge module (u9), which merges the records of the subdatabases (db1) on the optical disks into the magnetic disk database (db) in the magnetic disk storage device (diskstorage) according to the command of the database management system (dm), and generates the field structure information and the index information of the corresponding records, records the position information and the space information of the standard storage units, and forms the database properties data of the magnetic disk database (db).

Figure 3:
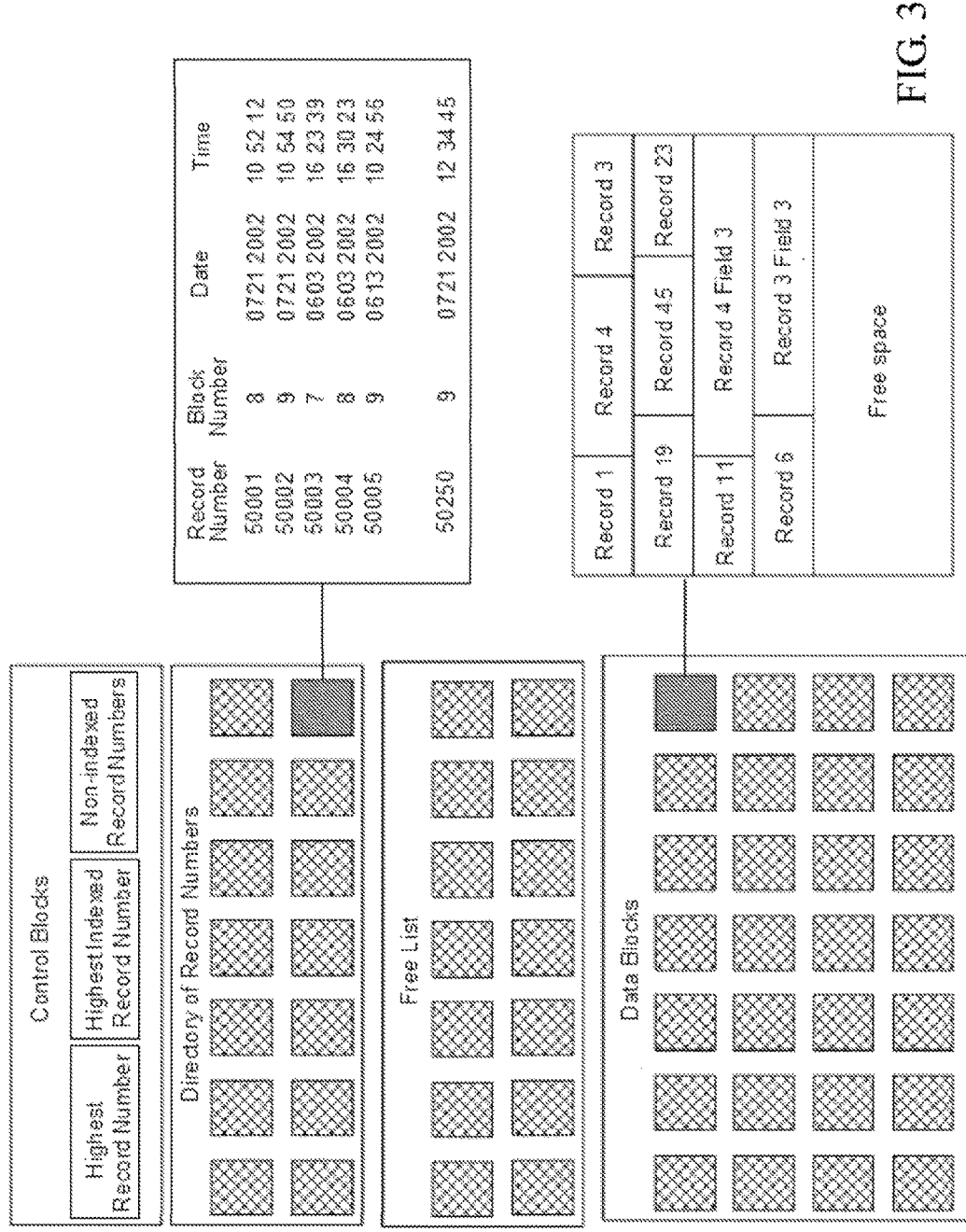
FIG. 3 is a schematic diagram of the physical structure of the database file according to the preferred embodiment of the database storage system based on optical disk of the present invention.

As shown in FIG. 3, the database file comprises the control blocks, the directory of record numbers, the free list and the data blocks.

The control blocks store the record numbers, the corresponding fields for the record numbers, the highest indexed record number, and the record numbers of modified records or newly increased records since last index, as well as the directory of record numbers and the address of free list, etc.

The directory of record numbers comprises many standard storage units. Each standard storage unit comprises a pointer which points to the latest version of each record, and the date and the time of creation/modification of this version.

The free list stores how much space is available in each standard storage unit.

The data blocks comprise standard storage units, and are the place which stores the data of the fields of each record; each data block stores whole record or a part of a record in continuous order.

By means of the database management system, the field structure information, the index information, and the position information of the standard storage units of each record forming the database properties data are updated along with changing and moving of the record.

This preferred embodiment of the present invention improves the data storage and backup functions on the basis of completing data response to user and ordinary data management of database by the database management system (dm). Using this embodiment, it can make the database management system (dm) split a huge magnetic disk database into several complete subdatabases; the structure of each subdatabase is the same as that of the original magnetic disk database; the associated data of each record of the subdatabases is integrated. The database management system (dm) can complete searching and retrieving data directly within the range of the record in subdatabases, it is not necessary to search and retrieve data in different fields of the same record crossing subdatabases, and the data integrity of each subdatabase is maintained.

Because the data of the subdatabases is integrated, and the database structure of the subdatabases is consistent with the database structure defined by the database management system (dm), in this embodiment, a subdatabase file with the corresponding capacity of a backup medium can be used as a backup file when a database is backed up, which makes the backup format of data consistent with the format of the database. Being able to make full use of advantage of the capacity of the jukebox, a large database is split directly into subdatabases, and the subdatabases are written onto the corresponding optical disks to realize data backup. At the same time, the database management system realizes that the rarely used data can be searched and retrieved directly in the jukebox, which reduces the needs for the magnetic disk storage device, and realizes that the composition cost of the system and electric power consumption of the system are reduced substantially. Furthermore, in the premise of ensuring the magnetic disk storage device has high efficiency in data response, the data security is improved.

When the database storage system based on optical disk of this invention is appropriately modified, the above mentioned system can also be applied in other SQL database system, which provides an excellent solution for extensively realizing data storage with high reliability.

When a database optical disk is put into an optical disk drive connected directly with a server or a jukebox, full-text search in the database on a database optical disk or in databases on several database optical disks can be performed continuously via the database management system on the server, including advanced search, such as refine search and boolean search etc., it is no longer necessary to restore the data first from the database on the database optical disk into the magnetic disk storage device.

When a database is created, and a database backup is performed, and databases are merged, as well as data search is performed on the database optical disk using the database storage system based on optical disk of this invention, two kinds of optical disks including a rewritable optical disk and a write-once optical disk are used. The rewritable optical disk can be written repeatedly, the write-once optical disk cannot be rewritten once the disk is written.

As shown in FIG. 4, the process for performing backup of a magnetic disk database onto optical disks using the above mentioned database storage system based on optical disk is as follows: in step 110, the capacity parameters of the optical disk storage media are obtained through the database management system; in step 115, the database properties data of the magnetic disk database in the magnetic disk storage device is read, the capacity of each record is calculated, a starting record number and a termination record number of each subdatabase, as well as the number of the records of each subdatabase are determined by the record split module (u6); in step 120, the subdatabase files having the same database structure are separately created on the optical disks by the database structure generation module (u8); in step 125, the records between the corresponding starting record number and termination record number of each subdatabase are written sequentially into the subdatabase file on the corresponding optical disk by the database creation on optical disk module (u7); in step 130, the field structure information of the corresponding records is written into each subdatabase file by the field structure generation module (u1); in step 135, the index information of the corresponding records is written into each subdatabase file by the record index generation module (u2); in step 140, the position information of the standard storage units of the corresponding records is written into each database file by the storage space allocation module (u3); in step 145, the space information of the standard storage units is recorded by the storage space status module (u4); and in step 150, the database properties data of the corresponding subdatabase is generated, and the backup of the database is completed by the record linkage module (u5).

As shown in FIG. 5, the process for restoring an optical disk database in a magnetic disk storage device using the above mentioned database storage system based on optical disk is as follows:

in step 210, a magnetic disk database file is created in a magnetic disk storage device by the database management system through the database structure generation module (u8); in step 215, the database properties data of the subdatabase on each optical disk is read, and the minimum record number and the maximum record number of the records are determined, as well as the capacity and the number of the records of each subdatabase determined by the database management system through the record split module (u6); in step 220, the records of each subdatabase are written sequentially into the magnetic disk database file in the magnetic disk storage device according to the record number order of each subdatabase by the database management system through the record merge module (u9); in step 225, the field structure information of the records is written into the magnetic disk database file by the field structure generation module (u1); in step 230, the index information of the records is written into the magnetic disk database file by the record index generation module (u2); in step 235, the position information of the standard storage units of the records is written into the magnetic disk database file by the storage space allocation module (u3); in step 240, the space information of the standard storage unit is recorded by the storage space status module (u4); and in step 245, the database properties data of the magnetic disk database is generated, and the restoration process of the database is completed by the record linkage module (u5).

As shown in FIG. 6, using the above mentioned database storage system based on optical disk, the process for creating a database on a magnetic disk using the data of optical disk databases is as follows: in step 310, a magnetic disk database file is created in a magnetic disk storage device by the database management system through the database structure generation module (u8); in step 315, the database properties data of the subdatabase on each optical disk is read, and the record number and the data volume of the records are determined, as well as the capacity of the records of each subdatabase is determined by the database management system through the record split module (u6); in step 320, the required records are read from each subdatabase, then the required records are written into the database file in the magnetic disk storage device by the database management system through the record merge module (u9); in step 325, the field structure information of the records is generated by the field structure generation module (u1); in step 330, the index information of the records is generated by the record index generation module (u2); in step 335, the position information of the standard storage units is recorded by the storage space allocation module (u3); in step 340, the space information of the standard storage units is recorded by the storage space status module (u4); and in step 345, the database properties data of the database in the magnetic disk storage device is generated, and the creation of the database in the magnetic disk using the data of the optical disk databases is completed by the record linkage module (u5).

As shown in FIG. 7, using the above mentioned database storage system based on optical disk, the process for creating a database on an optical disk using the data of a magnetic disk database is as follows: in step 410, a subdatabase file is created on an optical disk by the database management system through the database structure generation module (u8); in step 415, the database properties data of a magnetic disk database on a magnetic disk is read, and the storage capacity and the storage position of each record are determined by the database management system through the record split module (u6); in step 420, the required records are read from the magnetic disk database, then the required records are written into the database file on the optical disk by the database management system through the record merge module (u9); in step 425, the field structure information of the records is generated by the field structure generation module (u1); in step 430, the index information of the records is generated by the record index generation module (u2); in step 435, the position information of the standard storage units is recorded by the storage space allocation module (u3); in step 440, the space information of the standard storage units is recorded by the storage space status module (u4); and in step 445, the database properties data of the subdatabase on the optical disk is generated, and the creation of the database on the optical disk using the data of the magnetic disk databases is completed by the record linkage module (u5).

Embodiment 1: The method of creating a database on a rewritable optical disk using the rewritable optical disk includes the following steps:

In step 1, a server is connected directly with an optical disk drive.

In step 2, the database management system software is installed on the server.

In step 3, the drive letters of virtual optical disk drives are set up in a configuration file, MYCD=G:\, MYBD=H:\, wherein MYCD and MYBD are the drive letters of the virtual optical disk drives, and G and H are the drive letters of the optical disk drives. A server can be connected with several optical disk drives.

In step 4, a volume label is created on an optical disk; by erasing and formatting a rewritable optical disk, creating the volume label of the optical disk is completed.

In step 5, a database is created on the optical disk; the command "MYCD:database1" is executed.

In step 6, data is input into the database on the optical disk.

Embodiment 2: The method of creating a database on an optical disk of a jukebox using the rewritable optical disk includes the following steps:

In step 1, a server is connected with a jukebox.

In step 2, the database management system software and the jukebox management software are installed on the server.

In step 3, a drive letter of a virtual jukebox is set up in a configuration file, MYCD=Z:\, wherein MYCD is the drive letter of the virtual jukebox, and Z is the drive letter of the jukebox.

In step 4, a volume label "DVD1" is created on an optical disk using the jukebox management software.

In step 5, a database is created on the optical disk of the jukebox; the command "MYCD:DVD1\database1" is executed.

In step 6, data is input into the database on the optical disk of the jukebox.

The jukebox is a system for storing and managing optical disks, which consists of an exchanging optical disk mechanism, optical disk drives and magazines. The jukebox is a storage system for a massive database, and supports accessing the online jukebox having optical disks. To store database using the jukebox can ensure the physical security of data, and can expanse the system conveniently. CD, DVD and BD optical disk drives can be installed in the jukebox according to the needs.

Embodiment 3: The method of creating a database on a write-once optical disk includes the following steps:

In step 1, a server is connected directly with an optical disk drive.

In step 2, the database management system software is installed on the server.

In step 3, the drive letters of virtual optical disk drives are set up in a configuration file, MYCD=G:\, MYBD=H:\, wherein MYCD and MYBD are the drive letters of the virtual optical disk drives, and G and H are the drive letters of the optical disk drives. A server can be connected with several optical disk drives.

In step 4, a database is created in the magnetic disk storage device; the command "D:\database1" is executed.

In step 5, data is input into the database in the magnetic disk storage device.

In step 6, the path of the database is modified; the path "D:\" of the database is modified as "MYCD", and the command "MYCD:database1." is executed.

In step 7, the disk name of the optical disk is created on a write-once optical disk, and the database into which data has been input in the magnetic disk storage device is written onto the write-once optical disk.

Embodiment 4: The method of creating a database on an optical disk of a jukebox using the write-once optical disk includes the following steps:

In step 1, a server is connected with a jukebox.

In step 2, the database management system software and the jukebox management software are installed on the server.

In step 3, a drive letter of a virtual jukebox is set up in a configuration file, MYCD=Z:\, wherein MYCD is the drive letter of the virtual jukebox, and Z is the drive letter of the jukebox.

In step 4, a database is created in the magnetic disk storage device; the command "D:\database1" is executed.

In step 5, data is input into the database in the magnetic disk storage device.

In step 6, a volume label "DVD1" is created on an optical disk using the jukebox management software.

In step 7, the path of the database is modified; the path "D:\" of the database is modified as "MYCD", and the command "MYCD:DVD1\database1" is executed.

In step 8, the database is written onto the optical disk of the jukebox.

A database stored in a magnetic disk storage device can be split, and databases stored on optical disks can be merged using the database storage system based on optical disk of this invention.

When the capacity of a database in a magnetic disk storage device is bigger than the capacity of an optical disk, the database can be split into several smaller databases, and the capacity of each smaller database is made less than the capacity of an optical disk. The split and generated several smaller databases can be stored on several optical disks, and the structure of the database on each optical disk is the same as that of the original database.

Embodiment 5: The steps of splitting a database in a magnetic disk storage device and creating a database backup on optical disks are as follows:

In step 1, according the capacity of an optical disk storage medium, the database properties data of the database in the magnetic disk storage device is read, and the capacity of each record is calculated, and a starting record number and a termination record number of each subdatabase are determined, and the number of the records of each subdatabase is determined by the database management system.

In step 2, the corresponding subdatabase files are created separately on optical disks.

In step 3, the records between the corresponding starting record number and termination record number of each subdatabase are written sequentially into the subdatabase file on the corresponding optical disk, and the corresponding database properties data is written, and the backup of the database is completed.

The structure of the subdatabase on each optical disk used as backup is the same as that of the original database, and the corresponding data of the records of the subdatabase is included in this subdatabase file.

Embodiment 6: The steps of merging and restoring databases are as follows:

In step 1, the minimum record number and the maximum record number of the records are determined, and the capacity of the records of each subdatabase is determined according to the database properties data of the subdatabase on each optical disk.

In step 2, a database file is created in a magnetic disk storage device.

In step 3, the records of each subdatabase are written sequentially into the database file in the magnetic disk storage device according to the record number order of each subdatabase, and the database properties data of each subdatabase is updated, then the mergence and the restoration of the databases are completed.

One skilled in the art will understand that the embodiments of the present invention as shown in the drawings and described above are exemplary only and not intended to be limiting. It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

INDUSTRIAL APPLICABILITY

According to the database storage system based on optical disk of the present invention, the existing optical disk resource can be fully utilized. The desired path for realizing the process of hierarchical storage for database data through the magnetic disk storage device and the optical disk storage device is provided. Therefore, the market prospect is great and the industrial applicability is strong.

What is claimed is:

1. An improved database storage system based on an optical disk storage device, comprising: a server in a computer system, a database management system installed on the server, a magnetic disk storage device and an optical disk storage device connecting to the server via data connection, and a magnetic disk database created in the magnetic disk storage device, wherein the database management system is arranged for completing database management and data management of the magnetic disk storage device and for completing database management and data management of the optical disk storage device in response to data requests, and wherein the database management system comprises: one or more processor, and a memory couples to the processor for executing a field structure generation module, a record index generation module, a storage space allocation module, a storage space status module, a record linkage module, a record split module and a database creation on optical disk module, wherein the field structure generation module is configured to read field structure information of each record of databases of the magnetic disk and the optical disk storage devices and write the field structure information of each record of the databases into a database file or into the database management system, wherein the field structure information comprises a data type and a data length of each field of the record, wherein the record index generation module is configured to record index information of each record of the databases and writes the index information of each record of the databases into database file or into the database management system, wherein the index information comprises a modification time and a modification content of each field of the record;

wherein the storage space allocation module is configured to record position information of allocated standard storage units of each record in the database file, and writes the position information into the database file or the database management system;

wherein the storage space status module is configured to record free space information of the allocated standard storage units in the database file, and write the free space information into the database file or the database management system;

wherein the record linkage module is configured to combine the field structure information, the index information, the position information and the space information of the standard storage units of each record of the databases to form database properties data, and write the database properties data into the database file or the database management system;

wherein the record split module is configured to process a record splitting process for the records of the databases according to the command of the database management system, wherein the record splitting process is processed in a record unit, in which the database properties data of the databases is read, the position and the amount of data of each field in the records are determined, the records conforming to the command parameters are marked, and the marked information is written into the database file or the database management system; and wherein the database creation on optical disk module is configured to writes the records of the magnetic disk database which fit the capacity of an optical disk into an optical disk subdatabase on the optical disk created by the database management system, generates the field structure information and the index information of the record, records the position information and the space information of the standard storage units by the database management system and forms the database properties data of the subdatabase.

2. The improved database storage system based on optical disk storage device according to claim 1, wherein the database management system further comprises a database structure generation module, which is configured to forms an independent data file for the database structure of the databases; wherein the database management system is configured to creates the optical disk subdatabases having a database structure identical to the magnetic disk database on the optical disks or creates the magnetic disk database having the same database structure in other magnetic disk storage device based on the independent data file.

3. The database storage system of a server in a computer system based on optical disk storage device according to claim 2, wherein the database storage system comprises program instructions to perform a process of backup of a magnetic disk database onto optical disks, wherein the program instructions comprise the steps of:

obtaining the capacity parameters of the optical disk storage media through the database management system;

reading the database properties data of the magnetic disk database in the magnetic disk storage device, and calculating the capacity of each record, then determining a starting record number and a termination record number of each subdatabase, as well as the number of the records of each subdatabase through the record split module;

creating the subdatabase files having the same database structure separately on the optical disks by the database structure generation module;

sequentially writing the records between the corresponding starting record number and termination record number of each subdatabase into the subdatabase file on the corresponding optical disk by the database creation on optical disk module;

writing the field structure information of the corresponding records into each subdatabase file by the field structure generation module;
writing the index information of the corresponding records into each subdatabase file by the record index generation module;
writing the position information of the standard storage units of the corresponding records into each subdatabase file by the storage space allocation module;
recording the space information of the standard storage units by the storage space status module; and
generating the database properties data of the corresponding subdatabase, and completing the backup of the database by the record linkage module.

4. The improved database storage system based on optical disk storage device according to claim 1, wherein the database management system further comprises a record merge module which is configured to merge the records of the optical disk subdatabases on the optical disks into the magnetic disk database in the magnetic disk storage device according to the command of the database management system, generates the field structure information and the index information of the records, records the position information and the space information of the standard storage units, and forms the database properties data of the magnetic disk database.

5. The database storage system of a server in a computer system based on optical disk storage device according to claim 4, wherein the database storage system comprises program instructions to perform a restoring process for an optical disk database in a magnetic disk storage device, wherein the program instructions comprises the steps of:
creating a magnetic disk database file in a magnetic disk storage device by the database management system through the database structure generation module;
reading the database properties data of the subdatabase on each optical disk, and determining the minimum record number and the maximum record number of the records, as well as determining the capacity and the number of records of each subdatabase by the database management system through the record split module;
sequentially writing the records of each subdatabase into the magnetic disk database file in the magnetic disk storage device according to the record number order of each subdatabase by the database management system through the record merge module;
writing the field structure information of the records into the magnetic disk database file by the field structure generation module;
writing the index information of the records into the magnetic disk database file by the record index generation module;
writing the position information of the standard storage units of the records into the magnetic disk database file by the storage space allocation module;
recording the space information of the standard storage units by the storage space status module; and
generating the database properties data of the magnetic disk database, and completing the restoration process of the database by the record linkage module.

6. The database storage system of a server in a computer system based on optical disk storage device according to claim 4, wherein the database storage system comprises program instructions to perform a process of creating a database on a magnetic disk using the data of optical disk databases, wherein the program instructions comprise the steps of:
creating a magnetic disk database file in a magnetic disk storage device by the database management system through the database structure generation module;
reading the database properties data of the subdatabase on each optical disk, and determining the record number and the data volume of the records, as well as determining the capacity of the records of each subdatabase by the database management system through the record split module;
reading the required records from each subdatabase, then writing the required records into the database file in the magnetic disk storage device by the database management system through the record merge module;
generating the field structure information of the records by the field structure generation module;
generating the index information of the records by the record index generation module;
recording the position information of the standard storage units by the storage space allocation module;
recording the space information of the standard storage units by the storage space status module; and
generating the database properties data of the database in the magnetic disk storage device, and completing the database creation in the magnetic disk using the data of the optical disk databases by the record linkage module.

7. The database storage system of a server in a computer system based on optical disk storage device according to claim 4, wherein the database storage system comprises program instructions to perform a process of creating a database on an optical disk using the data of a magnetic disk database, wherein the program instructions comprise the steps of:
creating a subdatabase file on an optical disk by the database management system through the database structure generation module;
reading the database properties data of a magnetic disk database on a magnetic disk, and determining the storage capacity and the storage position of each record by the database management system through the record split module;
reading the required records from the magnetic disk database, then writing the required records into the database file on the optical disk by the database management system through the record merge module;
generating the field structure information of the records by the field structure generation module;
generating the index information of the records by the record index generation module;
recording the position information of the standard storage units by the storage space allocation module;
recording the space information of the standard storage units by the storage space status module; and
generating the database properties data of the subdatabase on the optical disk, and completing the database creation on the optical disk using the data of the magnetic disk databases by the record linkage module.

8. The database storage system of a server in a computer system based on optical disk storage device according to claim 4, wherein the database storage system comprises program instructions to perform a process of backup of a magnetic disk database onto optical disks, wherein the program instructions comprise the steps of:
obtaining the capacity parameters of the optical disk storage media through the database management system;

reading the database properties data of the magnetic disk database in the magnetic disk storage device, and calculating the capacity of each record, then determining a starting record number and a termination record number of each subdatabase, as well as the number of the records of each subdatabase through the record split module;

creating the subdatabase files having the same database structure separately on the optical disks by the database structure generation module;

sequentially writing the records between the corresponding starting record number and termination record number of each subdatabase into the subdatabase file on the corresponding optical disk by the database creation on optical disk module;

writing the field structure information of the corresponding records into each subdatabase file by the field structure generation module;

writing the index information of the corresponding records into each subdatabase file by the record index generation module;

writing the position information of the standard storage units of the corresponding records into each subdatabase file by the storage space allocation module;

recording the space information of the standard storage units by the storage space status module; and generating the database properties data of the corresponding subdatabase, and completing the backup of the database by the record linkage module.

9. A method for improving data processing by performing a backup of a magnetic disk database in a magnetic disk storage device of a server in a computer system into an optical disk storage device which comprises one or more optical disks, wherein the backup of the magnetic disk database is performed in response to a request to the server, wherein the method comprises:

obtaining capacity parameters of optical disk storage media of the optical disk storage device;

reading database properties data of the magnetic disk database, calculating a capacity of each record in the magnetic disk database, then defining the magnetic disk database into one or more subdatabases, wherein each of the subdatabases has a starting record number, a termination record number and a total number of records;

creating an independent data file having a database structure for each of the subdatabases of the magnetic disk database;

creating an optical disk subdatabase having a database structure identical to the database structure of the subdatabase of the magnetic disk database for each of the subdatabases of the magnetic disk database separately on the-optical disk of the optical disk storage device based on the independent data file for each of the subdatabases of the magnetic disk database;

sequentially writing the records between the starting record number and the termination record number of each of the subdatabases into the optical disk subdatabases on the optical disks respectively;

writing field structure information of each of the records into each of the optical disk subdatabases, wherein the field structure information comprises a data type and a data length for each field of each of the records;

writing index information of each of the records into each of the optical disk subdatabases, wherein the index information comprises a modification time and a modification content for each field of each of the records;

writing position information of standard storage units for each of the records into each of the optical disk subdatabases;

recording free space information of the standard storage units in each of the optical disk subdatabases; and generating the database properties data for each of the optical disk subdatabases by combining the field structure information, the index information, the position information and the free space information of the standard storage units of each of the records of each of the optical disk subdatabases, and completing the backup of the database.

* * * * *